United States Patent
Froelich

(10) Patent No.: US 10,140,986 B2
(45) Date of Patent: *Nov. 27, 2018

(54) SPEECH RECOGNITION

(71) Applicant: Microsoft Technology Licensing, LLC, Redmond, WA (US)

(72) Inventor: Raymond J. Froelich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,854

(22) Filed: Aug. 5, 2016

(65) Prior Publication Data
US 2017/0256258 A1 Sep. 7, 2017

Related U.S. Application Data

(63) Continuation-in-part of application No. 15/057,682, filed on Mar. 1, 2016.

(51) Int. Cl.
*G01L 21/00* (2006.01)
*G10L 15/22* (2006.01)
(Continued)

(52) U.S. Cl.
CPC .............. *G10L 15/22* (2013.01); *G10L 15/02* (2013.01); *G10L 15/063* (2013.01);
(Continued)

(58) Field of Classification Search
CPC ... G10L 15/22; G10L 15/32; G10L 2015/223; G10L 15/197; G10L 17/22; G10L 15/24;
(Continued)

(56) References Cited

U.S. PATENT DOCUMENTS 5,899,972 A 5/1999 Miyazawa et al.
6,219,643 B1 4/2001 Cohen et al.
(Continued)

FOREIGN PATENT DOCUMENTS

EP 1262954 12/2002
EP 1433165 3/2009
(Continued)

OTHER PUBLICATIONS

Antoine Raux, ("Flexible Turn-Taking for Spoken Dialog Systems, PhD Thesis", Carnegie Mellon University, Dec. 31, 2008, pp. 1-133).*
(Continued)

*Primary Examiner* — Vijay B Chawan
(74) *Attorney, Agent, or Firm* — Schwegman Lundberg & Woessner, P.A.

(57) ABSTRACT

Voice input is received from a user. An ASR system generates in memory a set of words it has identified in the voice input, and update the set each time it identifies a new word in the voice input to add the new word to the set, during at least one interval of speech activity. Information is pre-retrieved whilst the speech activity interval is still ongoing, for conveying in a response to be outputted at the end of the speech activity interval.

20 Claims, 5 Drawing Sheets

(51) Int. Cl.

| | | |
|---|---|---|
| *G10L 15/02* | (2006.01) | |
| *G10L 15/06* | (2013.01) | |
| *G10L 15/183* | (2013.01) | |
| *G10L 25/87* | (2013.01) | |
| *H04N 7/15* | (2006.01) | |
| *G10L 15/08* | (2006.01) | |
| *G10L 15/19* | (2013.01) | |

(52) U.S. Cl.
CPC .......... *G10L 15/183* (2013.01); *G10L 25/87* (2013.01); *H04N 7/157* (2013.01); *G10L 15/19* (2013.01); *G10L 15/222* (2013.01); *G10L 2015/0635* (2013.01); *G10L 2015/088* (2013.01); *G10L 2015/223* (2013.01)

(58) Field of Classification Search
CPC ......... G10L 25/78; G10L 15/20; G10L 25/87; G06F 3/167
USPC .... 704/233, 248, 253, 270, 270.1, 231, 236, 704/257, 9
See application file for complete search history.

(56) References Cited

U.S. PATENT DOCUMENTS

| | | | |
|---|---|---|---|
| 6,700,393 B2 | 3/2004 | Haag et al. | |
| 7,401,023 B1 | 7/2008 | Schwartz et al. | |
| 7,734,458 B1 | 6/2010 | Eguchi et al. | |
| 7,734,468 B2* | 6/2010 | Park ........................ | G10L 15/22 382/118 |
| 7,890,333 B2 | 2/2011 | Da Palma et al. | |
| 7,949,530 B2 | 5/2011 | Huang et al. | |
| 8,000,973 B2 | 8/2011 | Williams et al. | |
| 8,126,713 B2 | 2/2012 | Huang et al. | |
| 8,700,392 B1 | 4/2014 | Hart et al. | |
| 8,700,393 B2* | 4/2014 | Aleksic ................... | G10L 15/07 704/231 |
| 8,762,150 B2 | 6/2014 | Edgington et al. | |
| 9,009,041 B2* | 4/2015 | Zavaliagkos ........... | G10L 15/26 379/88.01 |
| 9,110,635 B2* | 8/2015 | Knox ....................... | G06F 3/017 |
| 9,361,885 B2 | 6/2016 | Ganong, III et al. | |
| 2003/0137537 A1 | 7/2003 | Guo et al. | |
| 2008/0319762 A1 | 12/2008 | Da Palma et al. | |
| 2010/0030400 A1 | 2/2010 | Komer et al. | |
| 2011/0125540 A1 | 5/2011 | Jang et al. | |
| 2011/0276329 A1 | 11/2011 | Ayabe et al. | |
| 2011/0314375 A1 | 12/2011 | Zaika et al. | |
| 2012/0034904 A1* | 2/2012 | LeBeau ................. | G10L 15/265 455/414.1 |
| 2013/0060570 A1* | 3/2013 | Williams ................ | G10L 15/04 704/251 |
| 2014/0278435 A1* | 9/2014 | Ganong, III ............ | G10L 15/22 704/275 |
| 2015/0088523 A1 | 3/2015 | Schuster | |
| 2015/0185996 A1 | 7/2015 | Brown et al. | |
| 2015/0340042 A1 | 11/2015 | Sejnoha et al. | |
| 2016/0171979 A1* | 6/2016 | Breazeal et al. ....... | B25J 9/0003 704/9 |
| 2017/0256259 A1 | 9/2017 | Froelich | |
| 2017/0256261 A1 | 9/2017 | Froelich | |

FOREIGN PATENT DOCUMENTS

| | | |
|---|---|---|
| GB | 2409087 | 6/2005 |
| WO | WO-8904035 | 5/1989 |

OTHER PUBLICATIONS

"International Search Report and Written Opinion", Application No. PCT/US2017/019255, dated Jun. 6, 2017, 13 pages.
"International Search Report and Written Opinion", Application No. PCT/US2017/019264, dated Jun. 6, 2017, 13 pages.
"Non-Final Office Action", U.S. Appl. No. 15/057,682, dated May 4, 2017, 9 pages.
Ferrer,"Is the Speaker Done Yet? Faster and More Accurate End-of-utterance Detection Using Prosody", 7th International Conference on Spoken Language Processing, Sep. 16, 2002, 4 pages.
Raux,"Flexible Turn-Taking for Spoken Dialog Systems", PhD Thesis, Carnegie Mellon University, Dec. 31, 2008, 151 pages.
Selfridge,"Continuously Predicting and Processing Barge-in During a Live Spoken Dialouge Task", Proceedings of the SIGDAL 2013 Conference, Aug. 24, 2013, pp. 384-393.
"Assistant—Virtual Voice Assistant—Dictate Commands with Voice Recognition, Ask Questions via Speech", Retrieved on: Oct. 14, 2015—Available at: http://testore.me/en/ios/apps/reference/491854246-assistant-virtual-voice-assistant-for-iphone-ipad/, 5 pages.
Hariharan,"Robust end-of-utterance detection for real-time speech recognition applications", In Proceedings of IEEE International Conference on Acoustics, Speech, and Signal Processing, vol. 1, May 7, 2001, pp. 249-252.
Karpagam,"An Intelligent Conversation Agent for Health Care Domain", In Proceedings of ICTACT Journal on Soft Computing, vol. 04, Issue 03, Apr. 2014, 5 pages.
Subhransu,"Building an iOS App like Siri", Available at: http://www.raywenderlich.com/60870/building-ios-app-like-siri, May 2, 2014, 21 pages.
"Final Office Action", U.S. Appl. No. 15/057,682, dated Nov. 15, 2017, 52 pages.
"International Search Report and Written Opinion", Application No. PCT/US2017/019270, dated May 26, 2017, 14 pages.
"International Search Report and Written Opinion", Application No. PCT/US2017/019232, dated Jun. 8, 2017, 15 pages.
"Non-Final Office Action", U.S. Appl. No. 15/229,916, dated Aug. 10, 2017, 10 pages.
"Non-Final Office Action", U.S. Appl. No. 15/229,978, dated Aug. 10, 2017, 9 pages.
"Non-Final Office Action Issued in U.S. Appl. No. 15/057,682", dated May 2, 2018, 27 Pages.
"Final Office Action Issued in U.S. Appl. No. 15/229,978", dated May 2, 2018, 18 Pages.
"Notice of Allowance Issued in U.S. Appl. No. 15/229,978", dated Jul. 19, 2018, 8 Pages.

* cited by examiner

SPEECH RECOGNITION

PRIORITY

This application in a continuation-in-part and claims priority to U.S. patent application Ser. No. 15/057,682 entitled "Conversational Software Agent" and filed Mar. 1, 2016, the disclosure of which is incorporated by reference herein in its entirety.

BACKGROUND

Communication systems allow users to communicate with each other over a communication network e.g. by conducting a communication event over the network. The network may be, for example, the Internet or public switched telephone network (PSTN). During a call, audio and/or video signals can be transmitted between nodes of the network, thereby allowing users to transmit and receive audio data (such as speech) and/or video data (such as webcam video) to each other in a communication session over the communication network.

Such communication systems include Voice or Video over Internet protocol (VoIP) systems. To use a VoIP system, a user installs and executes client software on a user device. The client software sets up VoIP connections as well as providing other functions such as registration and user authentication. In addition to voice communication, the client may also set up connections for communication events, for instant messaging ("IM"), screen sharing, or whiteboard sessions.

A communication event may be conducted between a user(s) and an intelligent software agent, sometimes referred to as a "bot". A software agent is an autonomous computer program that carries out tasks on behalf of users in a relationship of agency. The software agent runs continuously for the duration of the communication event, awaiting inputs which, when detected, trigger automated tasks to be performed on those inputs by the agent. A software agent may exhibit artificial intelligence (AI), whereby it can simulate certain human intelligence processes, for example to generate human-like responses to inputs from the user, thus facilitating a two-way conversation between the user and the software agent via the network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect of the present invention is directed to a computer system comprising: an input configured to receive voice input from a user; an ASR system for identifying individual words in the voice input, wherein the ASR system is configured to generate in memory during at least one interval of speech activity in the voice input a set of one or more words it has identified in the voice input, and update the set in the memory each time it identifies a new word in the voice input to add the new word to the set; a lookup module configured to retrieve during the intervals of speech activity in the voice input at least one word from the set in the memory at a first time whilst the speech activity interval is still ongoing, and perform a lookup whilst the speech activity interval is still ongoing to pre-retrieve information associated with the at least one word; and a response generation module configured to detect the end of the speech activity interval at a later time, the set having been updated by the ASR system at least once between the first time and the later time, and to generate based thereon a response for outputting to the user, wherein the response conveys the information pre-retrieved by the lookup module.

Performing a pre-emptive lookup before the user has finished speaking ensures that the final response can be outputted when desired, without delay. This provides a more natural conversation flow. The information that is pre-retrieved may for example be from an Internet search engine (e.g. Bing, Google etc.), or the user may be a user of a communication system and the information may be information about another user in the communication system. For example, the keyword may be compared with a set of user identifiers (e.g. user names) in a user database of the communication system to locate one of the user identifiers that matches the keyword, and the information may be information about the identified user this is associated with his username (e.g. contact details).

In embodiments, the response may be generated based on a confidence value assigned to at least one of the individual words by the ASR system and/or a confidence value assigned to the set of words by a language model of the computer system.

The information may be pre-retrieved from an Internet search engine.

The user may be a user of a communication system and the pre-retrieved information may be information about another user in the communication system. For example, the pre-retrieved information may comprise contact details for the other user.

The computer system may comprise a speech detection module configured monitor the set of identified words in the memory as it is updated by the ASR system, wherein the response generation module is configured to detect the end of the speech activity interval based on said monitoring of the identified set of words.

The computer system may further comprise a language model, wherein detecting the end of the speech activity interval comprises detecting, by the speech detection module, when the set of identified words forms a grammatically complete sentence according to the language model.

Detecting the end of the speech activity interval may comprise detecting, by the speech detection module, that no new words have been identified by the ASR system for a pre-determined duration.

The response may be an audio response for playing out to the user in audible form.

The computer system may comprise a video generation module configured to generate and output to the user a moving image of an avatar, which conveys when the outputting of the response is about to begin by performing a visual action.

The computer system may further comprise: a speech detection module; a response delivery module configured to begin outputting the audio response to the user when the speech activity interval has ended, wherein the outputting of the audio response is terminated before it has completed in response to the speech detection module detecting the start of a subsequent speech activity interval in the voice input.

The speech detection module may be configured to detect the start of subsequent speech activity interval by detecting an identification of another word in the voice input by the ASR system, the speech activity interval commencing with the detection of the other word.

Another aspect of the present invention is directed to a computer-implemented method of effecting communication between a user and an artificial intelligence software agent executed on a computer, the method comprising: receiving at an ASR system voice input from the user; identifying by the ASR system individual words in the voice input, wherein the ASR system generates in memory during at least one interval of speech activity in the voice input a set of one or more words it has identified in the voice input, and updates the set in the memory each time it identifies a new word in the voice input to add the new word to the set; retrieving during the interval of speech activity in the voice input at least one word from the set in the memory at a first time whilst the speech activity interval is still ongoing; performing a lookup whilst the speech activity interval is still ongoing to pre-retrieve information associated with the at least one word; detecting the end of the speech activity interval at a later time, the set having been updated by the ASR system at least once between the first time and the later time; and generating based thereon a response for outputting to the user, by the software agent, wherein the response conveys the information pre-retrieved by the lookup module.

The voice input may be received from a user device via a communication network, wherein the outputting step is performed by the software agent transmitting the response to the user device via the network so as to cause the user device to output the response to the user.

The voice input may be received from and the response outputted to the user in real-time, thereby effecting a real-time communication event between the user and the software agent via the network.

The method may be implemented in a communication system, wherein the communication system comprises a user account database storing, for each of a plurality of users of the communication system, a user identifier that uniquely identifies that user within the communication system; wherein a user identifier of the software agent is also stored in the user account database so that the software agents appears as another user of the communication system.

The method may comprise monitoring the set of identified words in the memory as it is updated by the ASR system, the end of the speech activity interval being detected based on said monitoring of the identified set of words.

Detecting the end of the speech activity interval may comprise detecting, by the speech detection module, when the set of identified words forms a grammatically complete sentence according to a language model.

Another aspect of the present invention is directed to a computer program product comprising an artificial intelligence software agent stored on a computer readable storage medium, the software agent for communicating with a user based on the output of an ASR system, the ASR system for receiving voice input from the user and identifying individual words in the voice input during at least one interval of speech activity in the voice input, the software agent being configured when executed to perform operations of: retrieving during the interval of speech activity in the voice input at least one word from the set at a first time whilst the speech activity interval is still ongoing; performing a lookup whilst the speech activity interval is still ongoing to pre-retrieve information associated with the at least one word; detecting the end of the speech activity interval at a later time, the set having been updated by the ASR system at least once between the first time and the later time; and generating based thereon a response for outputting to the user, by the software agent, wherein the response conveys the information pre-retrieved by the lookup module.

In embodiments, the response may be outputted to the user by transmitting it to a user device available to the user via a network so as to cause the user device to output the response to the user.

BRIEF DESCRIPTION OF FIGURES

For a better understanding of the present subject matter and to show how the same may be carried into effect, reference is made by way of example to the following figures, in which.

DETAILED DESCRIPTION OF EMBODIMENTS

An aim of the described embodiments is to enable a user(s) to have a conversation with a software agent over a communications network within a communication system, for example in a VoIP call. The conversation simulates the experience of talking to a real person for an extended period of time (e.g. several minutes). A challenge in making this experience appear lifelike is to have the agent know when the person is speaking, not speaking, ended a sentence or starting a new sentence.

Speech disfluencies, such as, "umm's", "arr's" etc. can create a very disjointed conversation with a software agent. Techniques that are described below reduce incidence of false recognition of speech, as they use the output of an Automatic Speech Recognition (ASR) system to detect when complete sentences are formed by spoken words identified by the ASR system.

An existing mechanism, referred to as Voice Activity Detection (VAD), uses a sound level detection system at a microphone to try and detect when a user is speaking. Such a system uses sound pressure at the microphone to detect activity and has no hard correlation to actual word utterances. This makes the system prone to false positives i.e. detecting speech when none is present due, for example, to high background noise levels or other audible disturbances detected by the microphone.

By contrast, herein, the output of the ASR system is used for determining when a user is speaking or not. This information to help make the conversation with a software agent more conversational and hence realistic.

The speech detection techniques of the present disclosure are described in further detail below. First, a context in which the techniques may be implemented is described.

Figure 1:
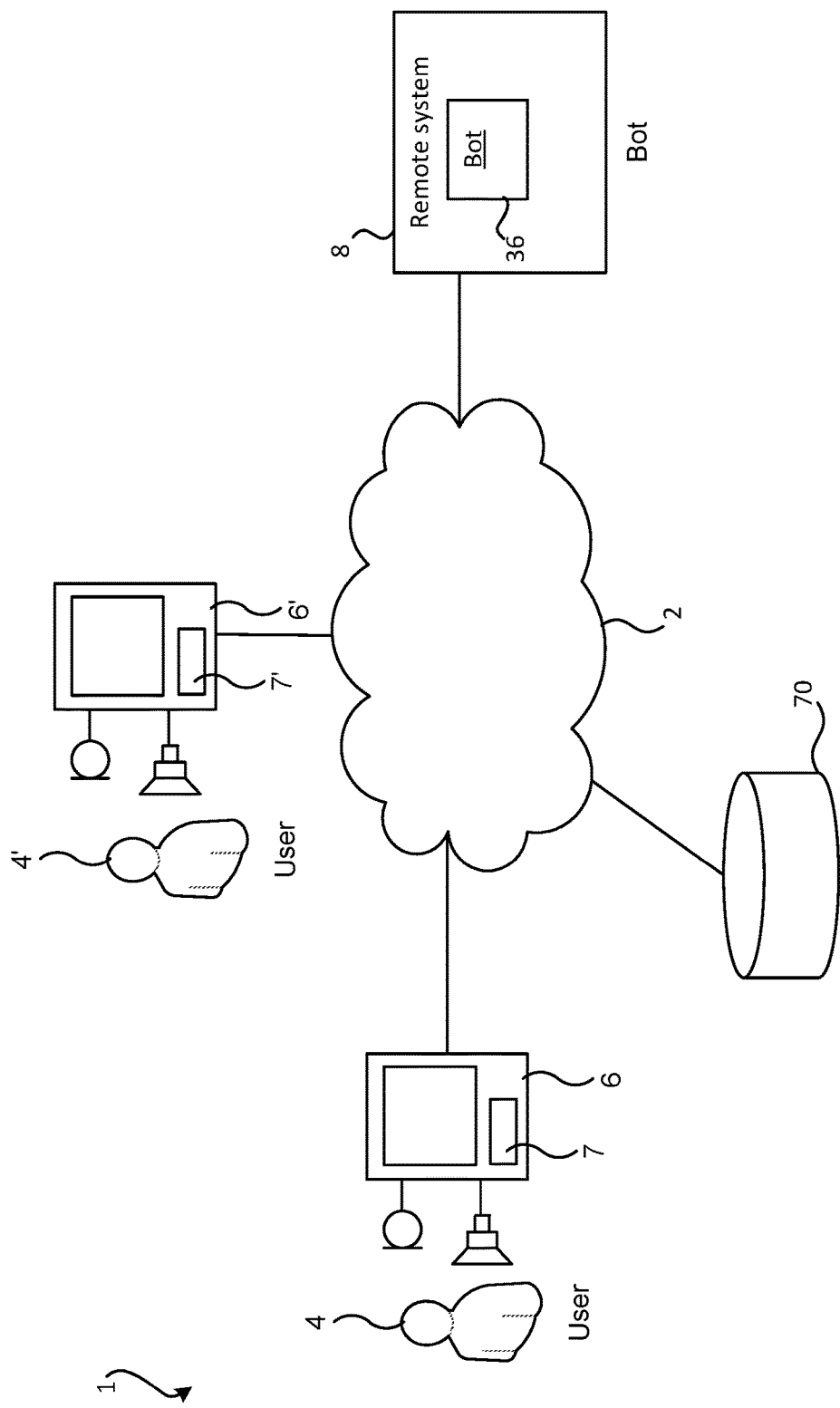
FIG. 1 shows a schematic block diagram of a communication system.

FIG. 1 shows a block diagram of a communication system 1. The communication system 1 comprises a communications network 2, to which is connected a first user device 6, a second user device 6', a remote computer system 8 (remote from the user devices 6, 6'), and a user account database 70. The network 2 is a packet-based network, such as the Internet.

The user devices 6, 6' are available to first and second users 4, 4' respectively. Each user device 6, 6' is shown to be executing a respective version of a communication client 7, 7'.

Each client 7, 7' is for effecting communication events within the communications system via the network, such as audio and/or video calls, and/or other communication event(s) such as a whiteboard, instant messaging or screen sharing session, between the user 4 and the other user 4'. The communication system 1 may be based on voice or video over internet protocols (VoIP) systems. These systems can be beneficial to the user as they are often of significantly lower cost than conventional fixed line or mobile cellular networks, particularly for long-distance communication. The client software sets up the VoIP connections as well as providing other functions such as registration and user authentication e.g. based on login credentials such as a username and associated password. To effect a communication event, data is captured from each of the users at their respective device and transmitted to the other user's device for outputting to the other user. For example, in a call, the data comprises audio data captured via a microphone of the respective device and embodying that user's speech (call audio) transmitted as an audio stream via the network 2, and may additionally comprise video data captured via a camera of the respective device and embodying a moving image of that user (call video) transmitted as a video stream via the network 2. The call audio/video is captured and encoded at the transmitting device before transmission, and decoded and outputted at the other device upon receipt. The users 4, 4' can thus communicate with one another via the communications network 2 audibly and (for a video call) visually. Alternatively, the call may be established via a cellular or fixed-line (e.g. PSTN) connection.

A communication event may be real-time in the sense that there is at most a short delay, for instance about 2 seconds or less, between data (e.g. call audio/video) being captured from one of the users at their device and the captured data being outputted to the other user at their device.

Only two users 4, 4' of the communication system 1 are shown in FIG. 1, but as will be readily appreciated there may be many more users of the communication system 1, each of whom operates their own device(s) and client(s) to enable them to communicate with other users via the communication network 2. For example, group communication events, such as group calls (e.g. video conferences), may be conducted between three or more users of the communication system 1.

Figure 2:
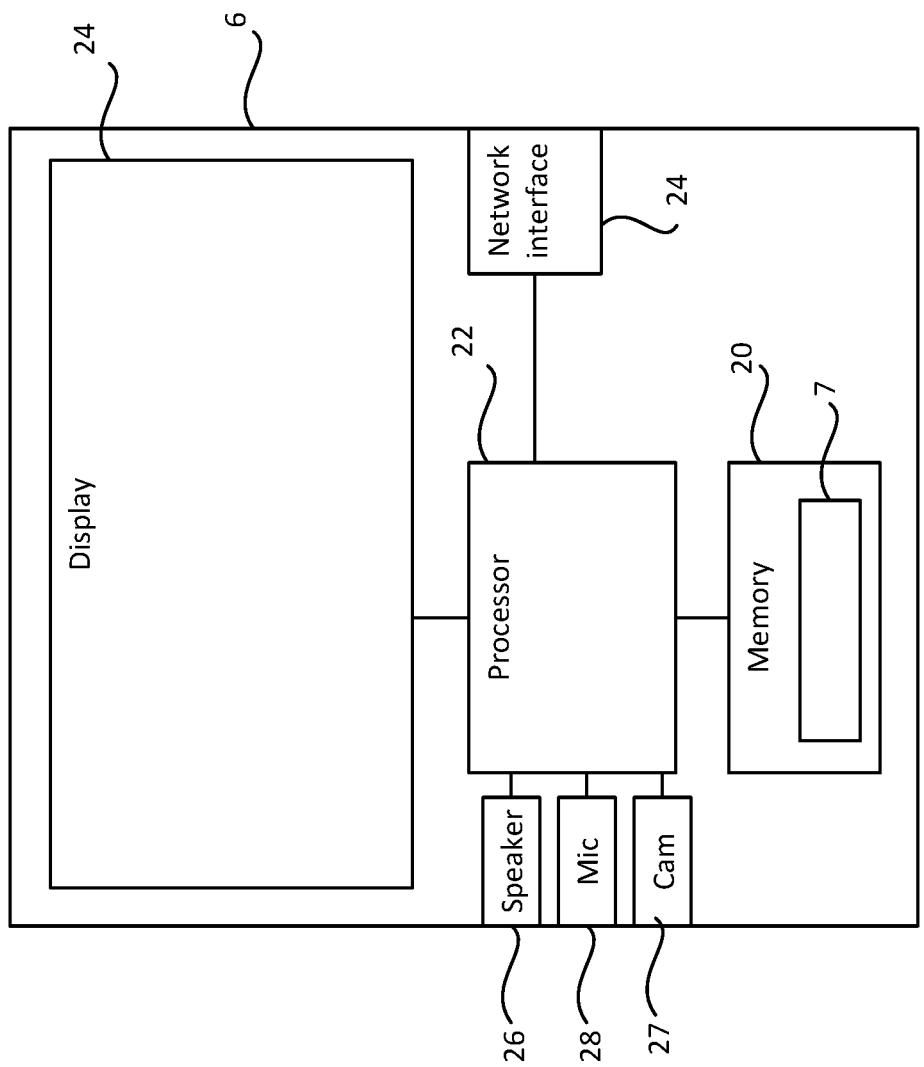
FIG. 2 shows a schematic block diagram of a user device.

FIG. 2 shows a block diagram of the user device 6. The user device 6 is a computer device which can take a number of forms e.g. that of a desktop or laptop computer device, mobile phone (e.g. smartphone), tablet computing device, wearable computing device (headset, smartwatch etc.), television (e.g. smart TV) or other wall-mounted device (e.g. a video conferencing device), set-top box, gaming console etc. The user device 6 comprises a processor 22, formed one or more processing units (e.g. CPUs, GPUs, bespoke processing units etc.) and the following components, which are connected to the processor 22: memory 22, formed on one or more memory units (e.g. RAM units, direct-access memory units etc.); a network interface(s) 24; at least one input device, e.g. a camera 27 and a microphone(s) 28 as shown; at least one output device, e.g. a loudspeaker (26) and a display(s) 24. The user device 6 connects to the network 2 via its network interface 24, so that the processor 22 can transmit and receive data to/from the network 2. The network interface 24 may be a wired interface (e.g. Ethernet, FireWire, Thunderbolt, USB etc.) or wireless interface (e.g. Wi-Fi, Bluetooth, NFC etc.). The memory holds the code of the communication client 7 for execution on the processor 7. The client 7 may be e.g. a stand-alone communication client application, plugin to another application such as a Web browser etc. that is run on the processor in an execution environment provided by the other application. The client 7 has a user interface (UI) for receiving information from and outputting information to the user 4. For example, the client 7 can output decoded call audio/video via the loudspeaker 26 and display 24 respectively. The display 24 may comprise a touchscreen so that it also functions as an input device. The client captures call audio/video via the microphone 28 and camera 27 respectively, which it encodes and transmits to one or more other user devices of other user(s) participating in a call. Any of these components may be integrated in the user device 2, or external components connected to the user device 104 via a suitable external interface.

Returning to FIG. 1, the user account database 70 stores, for each user of the communication system 1, associated user account data in association with a unique user identifier of that user. Thus users are uniquely identified within the communication system 1 by their user identifiers, and rendered 'visible' to one another within the communication system 1 by the database 70, in the sense that they are made aware of each other's existence by virtue of the information held in the database 70. The database 70 can be implemented in any suitable manner, for example as a distributed system, whereby the data it holds is distributed between multiple data storage locations.

The communication system 1 provides a login mechanism, whereby users of the communication system can create or register unique user identifiers for themselves for use within the communication system, such as a username created within the communication system or an existing email address that is registered within the communication system as used as a username once registered. The user also creates an associated password, and the user identifier and password constitute credentials of that user. To gain access to the communication system 1 from a particular device, the user inputs their credentials to the client on that device, which is verified against that user's user account data stored within the user account database 70 of the communication system 1. Users are thus uniquely identified by associated user identifiers (within the communication system 1. This is exemplary, and the communication system 1 may provide alternative or additional authentication mechanism, for example based on digital certificates.

At a given time, each username can be associated within the communication system with one or more instances of the client at which the user is logged. Users can have communication client instances running on other devices associated with the same log in/registration details. In the case where the same user, having a particular username, can be simultaneously logged in to multiple instances of the same client application on different devices, a server (or similar device or system) is arranged to map the username (user ID) to all of those multiple instances but also to map a separate sub-identifier (sub-ID) to each particular individual instance. Thus the communication system is capable of distinguishing between the different instances whilst still maintaining a consistent identity for the user within the communication system.

In addition to authentication, the client 7, 7' provide additional functionality within the communication system, such as presence and contact-management mechanisms. The former allows users to see each other's presence status (e.g.

offline or online, and/or more detailed presence information such as busy, available, inactive etc.). The latter allows users to add each other as contacts within the communication system. A user's contacts are stored within the communication system 1 in association with their user identifier as part of their user account data in the database 70, so that they are accessible to the user from any device at which the user is logged on. To add another user as a contact, the user uses their client 7 to send a contact request to the other user. If the other user accepts the contact request using their own client, the users are added to each other's contacts in the database 70.

The remote system 8 is formed of a server device, or a set of multiple interconnected server devices which cooperate to provide desired functionality. For example, the remote system 8 may be a cloud-based computer system, which uses hardware virtualization to provide a flexible, scalable execution environment, to which code modules can be uploaded for execution.

The remote computer system 8 implements an intelligent software agent ("bot") 36, the operation of which will be described in due course. Suffice it to say, the bot 36 is an artificial intelligence software agent configured so that, within the communication system 1, it appears substantially as if it were if another member of the communication system. In this example, Bot 36 has its own user identifier within the communication system 1, whereby the user 4 can (among other things):

receive or instigate calls from/to, and/or IM sessions with, the bot 36 using their communication client 7, just as they can receive or instigate calls from/to, and/or IM sessions with, other users 2' of the communication system 1;

add the bot 36 as one of their contacts within the communication system 1. In this case, the communication system 1 may be configured such that any such request is accepted automatically;

see the bot's presence status. This may for example be "online" all or most of the time, except in exceptional circumstances (such as system failure).

This allows users of the communication system 1 to communicate with the bot 36 by exploiting the existing, underlying architecture of the communication system 1. No or minimal changes to the existing architecture are needed to implement this communication. The bot thus appears in this respect as another user 'visible' within the communication system, just as users are 'visible' to each other by virtue of the database 70, and presence and contact management mechanisms.

The bot 36 not only appears another user within the architecture of the communication system 1, it is also programmed to simulate certain human behaviours. In particular, the bot 36 is able to interpret the speech in a user's call audio, and respond to it in an intelligent manner. The bot 36 formulates is responses as synthetic speech, that is transmitted back to the user as call audio and played out to them in audible form by their client 7 just as a real user's call audio would be. The bot 36 also generates synthetic video, in the form of an "avatar", which simulates human visual actions to accompany the synthetic speech. These are transmitted and displayed as call video at the user device 2, in the same way that a real user's video would be.

Figure 3:
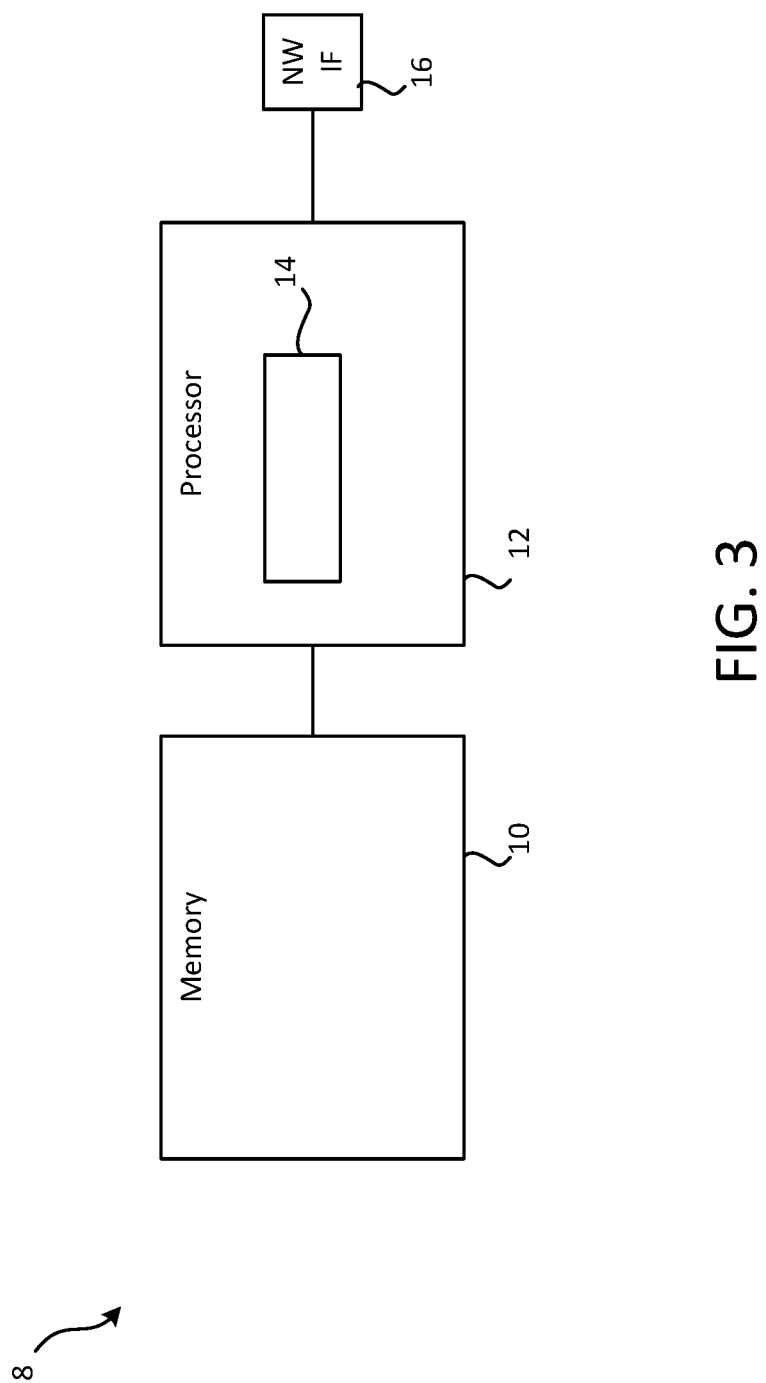
FIG. 3 shows a schematic block diagram of a remote system.

FIG. 3 shows a block diagram of the remote system 8. The remote system 8 is a computer system, which comprises one or more processors 10 (each formed of one or more processing units), memory 12 (formed of one or more memory units, which may be localized or distributed across multiple geographic locations) and a network interface 16 connected to the processor(s) 10. The memory holds code 14 for execution on the processor 10. The code 14 includes the code of the software agent 36. The remote system connects to the network 2 via the network interface 16. As will be apparent, the remote system 8 may have a more complex hardware architecture than is immediately evident in FIG. 3. For example, as indicated, the remote system 8 may have a distributed architecture, whereby different parts of the code 14 are executed on different ones of a set of interconnected computing devices e.g. of a cloud computing platform.

Figure 4:
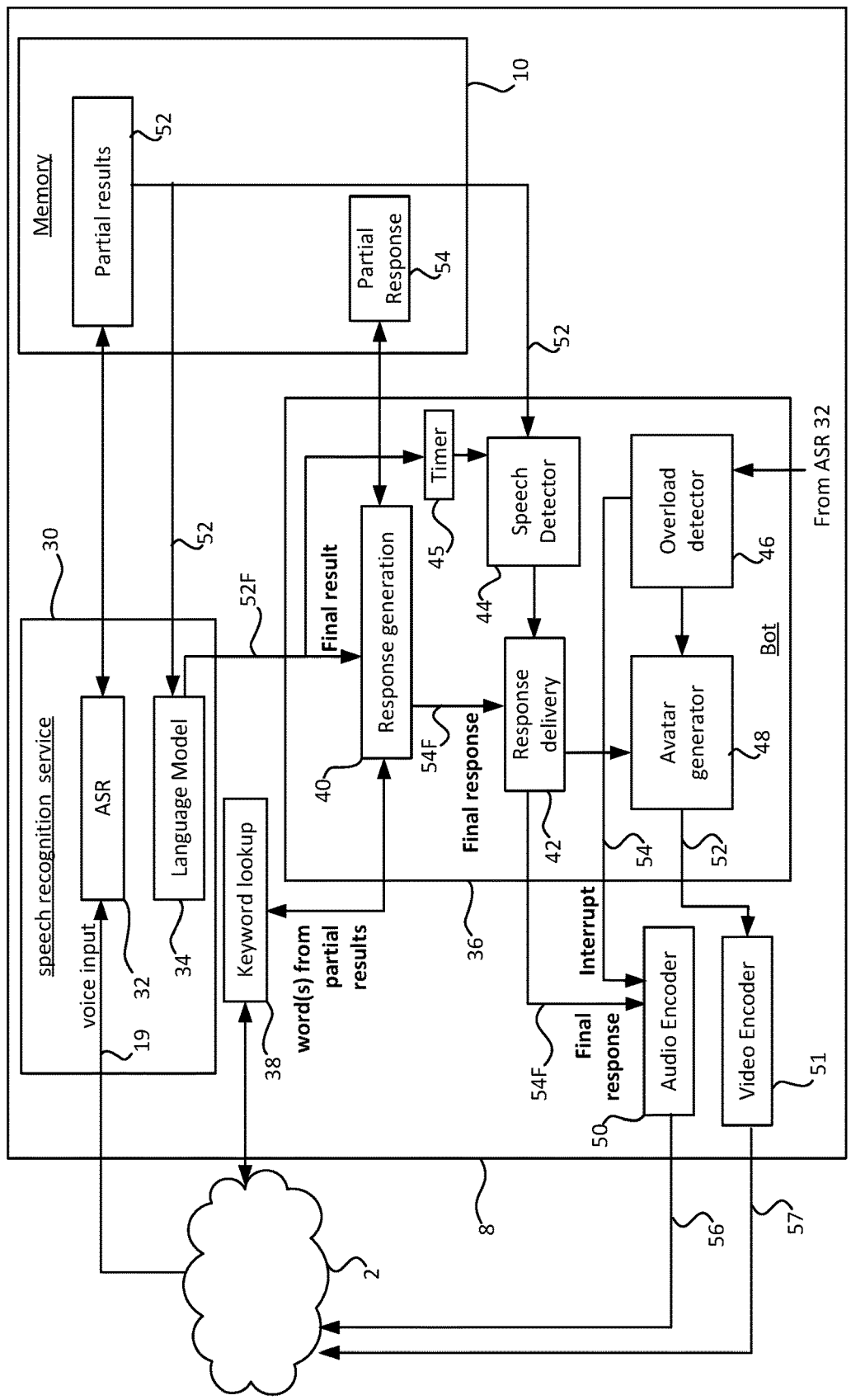
FIG. 4 shows functional modules of a remote system.

FIG. 4 shows the following functional modules of the remote system 8: an ASR (automatic speech recognition) system 32; a language model 34; a keyword lookup service 38, a response generator 40 and a response delivery module 42 (which constitute a response module; a speech detector 44 and a timer 45; a speech overload detector 46; an avatar generator 48; and audio and video encoders 50, 51. The functional modules are software modules of the code 14 i.e. each represents functionality that is implemented by executing part of the code 14 on one of the processor(s) 10 of the remote system 8. Note that FIG. 4 is highly schematic, and that in embodiments they system may comprise other functional modules, for example to implement acoustic modelling, intent detection etc., which may be used in conjunction with the techniques described herein to drive the behaviour of the bot 36.

The ASR system 32 and language model 34 constitute a conversational understanding speech recognition service 30. The speech recognition service 30 receives voice input 19 from the user 4, which is received from the user device 4 via the network 2 as call audio in an incoming audio stream.

The ASR system 32 provides continuous recognition, which means that as the user 4 starts speaking the ASR system 32 starts to emit partial hypothesis on what is being recognized. The partial hypotheses continue to be emitted until the language model 34 determines that a whole sentence is grammatically complete and emits a final result. If the speaker keeps talking a new partial response will begin. Conversations with the software agent 36 are controlled using the capabilities of the conversational understanding speech recognition service 30.

The ASR system 32 identifies individual words in the voice input 19 (i.e. as spoken by the user 4), and stores them as partial results 52 in the memory 10 in a manner that conveys the relative order in which they were spoken by the user 4. The partial results 52 are in the form of a set of words that the ASR system 32 has identified in the voice input 19 ("provisional set"). The provisional set 52 is a data structure which conveys the relative ordering of the words it contains. The provisional set 52 is updated each time the ASR system 32 identifies a new word in the voice input 19 to add the new word to the set 52 as the most recently spoken word.

Figure 5A:
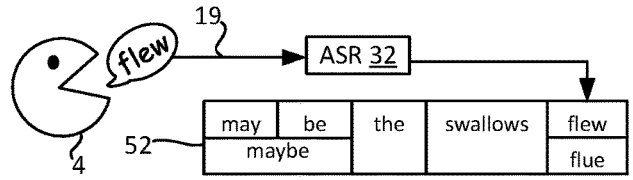
FIG. 5A illustrates an exemplary conversation between a user and a software agent.

A portion of the voice input 19 may be ambiguous, in the sense that it could realistically correspond to more than one word. This is illustrated in FIG. 5A, which shows how possible words are added to the provisional set of words 52 as the user 4 speaks. In this example, the user 4, in lamenting an apparent absence of swallows in his or her vicinity, has just spoken the word "flew", preceded by the words "maybe the swallows". The English verb "flew", however, has a similar pronunciation to the English noun "flue". The ASR system 32 recognized both possibilities, and thus adds both words to the provisional set 52 as possible alternatives for the utterance immediately preceding "swallows" (note in this example the ASR system 32 is not accounting for the context in which words are spoken—that is one of the functions of the language model 34, as explained below). A similar ambiguity is also evident in this example with respect to the word "maybe", as this has a similar pronunciation in English as the two-word phase "may be". Thus, the ASR system 32 has included both the word "maybe" and the two-word phrase "may be" as possible alternatives to one another for the utterance immediately preceding "the" in the provisional set 52.

The provision set 52 thus identifies one or more possible sequences of words spoken by the user 4. Multiple sequences arise due to the ambiguities discussed above: in the example of FIG. 5A, the provisional set 52 identifies fours possible sequences of words that the user might have just spoken:

"may be the swallows flew"
"maybe the swallows flew"
"may be the swallows flue"
"maybe the swallows flue"

The provisional set 52 may have a text format, whereby each word in the provisional set 54 is stored as a string of one or more characters, generated by the ASR system 32 applying a speech-to-text algorithm to the voice input 19.

The language model 34 applies a set of grammatical rules to the provisional set of words 52 to determine additional information about the semantic content of the voice input 19, above and beyond that conveyed by the individual words in isolation, by taking into account semantic relationships between the individual words in order to provide a sentential response.

For example, the language model 34 may assign, based on the set of grammatical rules, a probability (or other confidence value) to each of possible sequence of words. The probability is assigned to the sequence as a whole, and denotes a context-dependent likelihood that that combination of words as a whole was the one spoken by the user. Such language models are known in the art. Following the example of FIG. 5A, it will be evident that, when the set of grammatical rules is a reasonable approximation to English-language grammar, sequence 2 (above), i.e., "maybe the swallows flew", will be assigned a significantly higher probability (or other confidence value) than the remaining sequences.

Figure 5B:
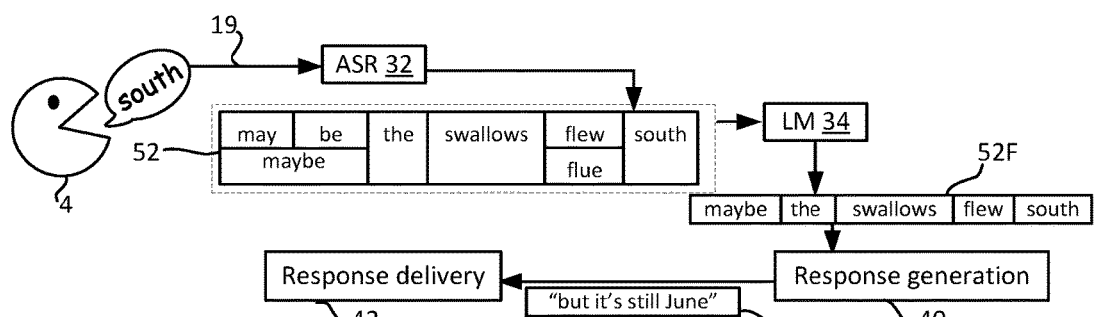
FIG. 5B illustrates the conversation at a later point in time.

FIG. 5B illustrates how, as the user continues to speak, their spoken words are added to the provisional set 52 as they are identified. In this example, the next word to be spoken by the user is "south", which is added to the set as the utterance immediately preceding "flew"/"flue". Confidence values may also be assigned to the output of the ASR i.e. to the individual candidate words, e.g. "flew" and "flue" may be assigned individual confidence values based on the corresponding utterance alone, which can be combined with the confidence values assigned to sets of multiple words in determining which set of words has most likely been spoken. That is, both individual confidence values and confidence values pertaining to the set as a whole may be used in generating suitable responses.

An additional function of the language model 34 is one of detecting a grammatically complete sentence in the provisional set 54. That is, language model detects when, by virtue of the successive updates to the provisional set 52 by the ASR system 32, at least one of the word sequences identified in the provisional set of words 52 has become sufficiently complete as to form a grammatically complete sentence, according to the set of grammatical rules it is applying.

In response to detecting the grammatically complete sentence, the language model 34 makes a final decision on the sequence of words spoken by the user up to that point in time, and outputs this sequence as a final result 52F. For example, the final result 52F may be whichever sequence of words identified in the provisional set 52 has been assigned the highest probability by the language model 34.

Following the example of FIG. 5B, the addition of the word "swallows" to the set 52 results in at least one grammatically complete sentence, notably "maybe the swallows flew south". This is detected by the language model 34, and in response the language model 34 outputs the sequence having the highest probability according to the set of grammatical rules—i.e. "maybe the swallows flew south"—as a final result 52F. In some cases, a set of one or more final results may be outputted at this point e.g. all those with a probability above a threshold, so that the bot 36 can decide for itself which is most likely in view of any additional context to which it has access.

If the speaker 4 keeps talking after the final result 52F has been outputted, new partial results 52' will be generated in the memory 10 and updated in the same manner as the user 4 continues to speak, until a grammatically complete sentence is once again detected—this time, in the new set of partial results 52'. In response, a second final result 52F' is outputted based the new partial results in response, according to the same procedure.

Figure 6A:
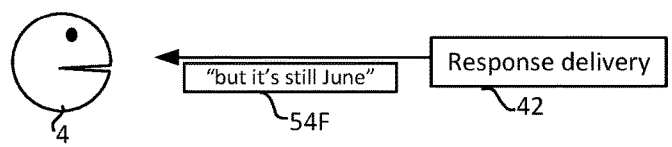
FIGS. 6A and 6B show different examples of how the conversation might progress after the point in time of FIG. 5B.
Figure 6B:
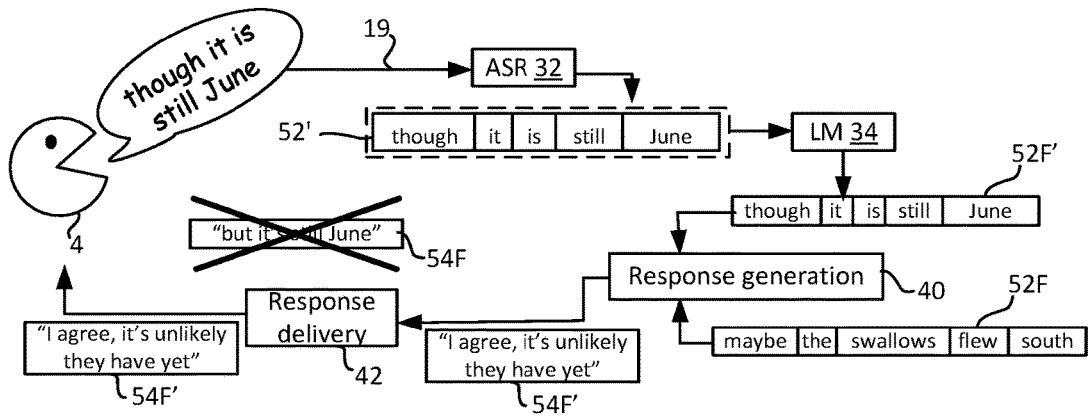

This is illustrated in the example of FIG. 6B, which shows how, on reflection, the user 4 has noted that it is unlikely for the swallows to have flown south from Europe, as it is too early in the year, which they express as the spoken statement "though it is still June".

In other words, the speech recognition service 30 operates cyclically on two levels of granularity. The ASR system 32 operates continuously to repeatedly identify individual words as they are spoken by the user 2 i.e. to generate and update the partial results 52 on a per-word basis. As these words are identified, the language model 34 operates continuously to repeatedly identify whole sentences spoken by the user i.e. the final result 52F, on a per-sentence basis. Both mechanisms are used to control the conversational agent 36, as described below, whereby the bot 36 exhibits both per-word and per-sentence behaviour.

The response generator 40 represents one aspect of the intelligence of the agent 36. The response generator 40 generates in the memory 10 what is referred to herein as a partial response 54. This is generated based on the partial results 52 from the ASR system 32, and updated as the partial results 54 are updated on a per-word basis (though it may not necessarily be updated every time a new word is detected). The partial response 53 is provisional, in that it is not necessarily in a form ready for outputting to the user. It is only when the final result 52F is outputted by the language model 34 (i.e. in response to the detection of the grammatically complete sentence) that the partial response 54 is finalized by the response generator 40, thereby generating a final response 54F. The response 54F is "final" in the sense that it is a complete response to the grammatically complete sentence as detected by the language model 34, that is substantially ready for outputting to the user 4, in the sense that its information content is settled (though in some cases some formatting, such as text-to-speech conversion may still be needed).

This is illustrated in FIG. 5B. As can be seen, in response to the final result 52F, which is the sentence "maybe the swallows flew south", the response generator 40 generates the final response 54F, which is the sentence "but it's still June", based on an interpretation by the bot 36 both of the sentence 52F and an understanding of ornithological migration patterns in the Northern Hemisphere that are encoded in its artificial intelligence processes.

Note, however, that this final response 54F may not actually be outputted to the user 2 at all, or may only be partially outputted to the user 2—whether or not it is outputted (or if its outputting is halted) is controlled by the speech detector 44. The final response 54F is outputted to the response delivery module 42, which selectively communicates it to the user as outgoing call audio the control of the speech detector 44. This is described in detailed below. For now, suffice it to say the final response 52 is outputted to the user by the response delivery module 54 if they have finished speaking at this point for the time being—this scenario is illustrated in FIG. 6A, in which the response delivery module 42 is shown commencing the outputting of the final result 54F to the user 4 as they are no longer speaking.

By contrast, as mentioned above, FIG. 6B shown an alternative scenario, in which the user 4 quickly comes to their own realization of swallows' migratory habits in Europe, expressed in their statement "though it is still June" (implicit in which is the realization that their preceding statement "perhaps the swallows flew south" is unlikely).

In the scenario of FIG. 6B, the continuing voice input 19 is interpreted by the ASR system 32 as new partial results in the form of a second provisional set of words 54'. Though not shown explicitly in FIG. 6B, it will be appreciated that the words are added to the new set 52' in the order they are said, in the manner described above. The word "June" is added to the new set 52' last, thereby causing the new set 52' to also form a grammatically complete sentence, which is detected by the language model 34, causing it to output the sentence "though it is still June" to the response generator 40 as a new final result 54F'.

As will be apparent in view of the above, the operation of response generation module 40 is cyclical, driven by and on the same time scale as the cyclical operation of the language model 34 i.e. on a per-sentence basis: each time a new final result (i.e. new complete sentence) is outputted by the language model 34, a new final response is generated by the response generator 40.

Note, however, that by generating and updating the partial response 54 based on the partial results 52 on a per-word basis (and not just the final result 52F'), the response generator 40 is able to generate the final response 54F more quickly when the final result 52F is finally outputted by the language model 34 that it would be able to if it relied on the final result 52F alone.

In generating the partial response 54, the response generation module 40 can communicate one or more identified words in the set of partial results 52 to the keyword lookup service 38, in order to retrieve information associated with the one or more words. The keyword lookup service 38 may for example be an independent (e.g. third-party) search engine, such as Microsoft (R) Bing (R) or Google, or part of the infrastructure of the communication system 1. Any retrieved information that proves relevant can be incorporated from the partial response 54 into the final response 54F accordingly. This pre-lookup can be performed whilst the user is still speaking i.e. during an interval of speech activity (when the speech detector 42 is still indicating a speaking state—see below), and subsequently incorporated into the final response 54F for outputting when the speech activity interval ends and the next speech inactivity begins (when the speech detector 44 transitions to a non-speaking state). This allows the bot to be more response to the user, thus providing a more natural conversation flow.

The selective outputting of final responses to the user 4 by the response delivery module 42 is driven by the speech detector 44.

Notable, the speech detector 44 uses the output of the speech recognition service 30 to detect speech (in)activity, i.e. in switching between a currently speaking and a currently non-speaking state. It is these changing in the state of the speech detector 44 that drive the response delivery module 42. In particular, it uses both the partial and final results 52, 52F to detect intervals of speech activity in the voice input 19, in which the user 4 is determined to be speaking ("speech intervals") and intervals of speech inactivity, in which the user 4 is determined to not be speaking ("non-speech intervals") according to the following rules:

following an interval of speech inactivity, an interval of speech activity commences in response to a detection of the ASR system 32 beginning to output partial results 52; that is, the interval of detected speech inactivity ends and the interval of detected speech activity begins when and in response to the ASR system 32 identifying at least one individual word in the voice input 19 during the interval of speech inactivity;

following an interval of speech activity, an interval of speech inactivity commences:
  in response to a final result 52F being outputted by the language model 34, triggered by detecting a condition indicative of speech inactivity, such as the language model 34 detecting a grammatically complete sentence,
  only after an interval of time (e.g. one to three seconds) has passed since the detected speech inactivity condition that triggered the outputting of the final result 52F, and
  only if no new partials have been detected in that interval of time i.e. only if the ASR system 32 has not identified any more words in the voice input 19 in that interval of time.

Note that, in contrast to conventional voice activity detectors, the speech detection is based on the output of the speech recognition service 30, and thus takes into account the semantic content of the voice input 19. This is in contrast to known voice activity detectors, which only consider sound levels (i.e. signal energy) in the voice input 19. In particular, it will be noted that according to the above procedure, a speech inactivity interval will not commence until after a grammatically complete sentence has been detected by the language model 34. In certain embodiments, the interval of speech inactivity interval will not commence even if there is a long pause between individual spoken words mid-sentence (in contrast, a conventional VAD would interpret these long pauses as speech inactivity), i.e. the speech detector 44 will wait indefinitely for a grammatically complete sentence.

However, in other embodiments, a fail-safe mechanism is provided, whereby the speech inactivity condition is the following:
  the language model 34 has detected a grammatically complete sentence; or
  no new words have been identified in by the ASR system 32 for a pre-determined duration, even if the set of words does not yet form a grammatically complete sentence according to the language model 34.

The occurrence of either event will trigger the final response 54F.

Moreover, in alternative embodiments, a simpler set of rules may be used, whereby the speech inactivity condition is simply triggered when no new words have been outputted by the ASR system 32 for the pre-determined duration (without considering the grammatical completeness of the set at all).

In any event, it should be noted that the interval of speech inactivity does not commence with the detection of the speech inactivity condition, whatever that may be. Rather, the interval of speech inactivity only commences when the afore-mentioned interval of time has passed from the detection of that condition (which may be the detection of the grammatically complete sentence, or the expiry of the pre-determined duration) and only if no additional words have been identified by the ASR system 32 during that interval. As a consequence, the bot does not begin speaking when the speech inactivity condition is detected, but only when the subsequent interval running from that detection has passed (see below), and only if no additional words have been identified by the ASR system 32 in that interval (see below).

The response delivery module 42 selectively outputs the final response 54F to the user 2 in audible form under the control of the speech detector 44, so as to give the impression of the bot speaking the response 54F to the user 2 in the call in response to their voice input 19 in the manner of a conversation between two real users. For example, the final response 54F may be generated in a text format, and the converted to audio data using a text-to-speech conversion algorithm. The final response 54F is outputted in audible form to the user 2 over a response duration. This is achieved by the audio encoder 50 encoding the final response 54F as real-time call audio, that is transmitted to the user device 2 via the network 2 as an outgoing audio stream 56 for playing out thereat in real-time (in the same manner as conventional call audio).

Outputting of the final response 54F to the user 2 only takes place during detected intervals of speech inactivity by the user 2, as detected by the speech detector 44 according to the above protocols. Thus the outputting of the final response 45F only begins when the start of a speech inactivity interval is detected by the speech detector 44. If the speech detector detects the start of an interval of speech inactivity during the response duration before the outputting of the final response has completed, the outputting of the response is halted—thus the user 2 can "interrupt" the bot 36 simply by speaking (resulting in new partial results being outputted by the ASR system 32), and the bot 36 will silence itself accordingly.

Should the user continue to speak after the final result 52F has been outputted by the language model 34—i.e. soon enough to prevent the speech detector 44 from switching to a non-speech interval—the final response generated 52F based on that final result 54F is not outputted to the user 2. However, that final result 52F and/or that final response 54F and/or information pertaining to either are retained in the memory 10, to provide context for future responses by the bot 36.

In other words, whenever any condition indicative of speech inactivity is detected, the system generates a final response whose content is such that it could be outputted to the user if they have indeed finished speaking for now; however, that final response is only actually delivered to the user if they do not speak any more words for an interval following the detected condition. In other words, final responses are generated pre-emptively, when it is still not certain whether the user has actually finished speaking for now (and would thus expect the bot to now respond). This ensures that the bot can remain responsive to the user, at the cost of performing a certain amount of redundant processing.

The scenario of FIG. 6B is an example of this. The bot's original final response 54F ("but it's still June") is not outputted in this scenario as a result of the user 4 continuing to speak. The new final response 54F', is generated in response to and based on the new final result 52F' ("though it is still June"), but also based on both the previous final result 52F ("maybe the swallows flew south"). By interpreting both sentences 52F, 52F', the bot 36 is able to recognize the implicit realization by the user 2 that the swallows are unlikely to have flown south because of the time of year (which would not be evident from either sentence 52F, 52F' individually), and generate the new final response 54F' accordingly, which is the sentence "I agree, it's unlikely they have yet".

Where appropriate, the bot 36 can also "interrupt" the user 4 in the following sense.

The response generation module 40 has limited processing capabilities, in that of the user continues to speak for a long interval, it cannot keep indefinitely generating new responses whilst still using all of the context of the user's earlier sentences. For example, the operation of the bot 36 may be controlled by a so-called "AI tree", which is essentially a decision tree. In response to detecting that the partial/final results 52/52F meet certain predetermined criteria, the bot 36 follows associated branches of the AI tree thereby progressing along it. When the end of the AI tree is reached, the bot 36 cannot progress further, so is unable to take into account any additional information in the user's voice input 19. Thus there is little point in the user continuing to speak as this will have no effect on the subsequent behaviour of the bot 36, which may give the user 4 the impression of being ignored to an extent by the bot 36. If the user 4 does continue to speak, this constitutes an overload condition due to the user overloading the bot with information it is now unable to interpret.

In this case, during each interval of detected speech activity, the overload detector 46 counts a number of words that have been identified by the ASR system 32 and/or a number of times that final results have been outputted by the language model 34, i.e. a number of grammatically complete sentences that have been detected by the language model 34, since the most recent final response was actually outputted to the user. Should the number of words and/or sentences reach a (respective) threshold during that speech interval, the overload detector outputs a notification to the user of the overload condition, requesting that they stop speaking and allow the bot 36 to respond. Alternatively, the overload detector 46 may track the state of the AI tree, and the overload condition detected by detecting when the end of the AI tree has been reached.

Another type of overload condition is caused by the user speaking too fast. For example, the ASR system may have limited processing capabilities in the sense that it unable to properly resolve words if they are spoken to quickly. The overload detector 46 measures a rate at which individual words are being identified by the user during each interval of detected speech activity, and in response to this rate reaching a threshold (e.g. corresponding to the maximum rate at which the ASR system can operate correctly, or shortly below that), the overload detector outputs a notification of the overland condition to the user 2, requesting that they speak more slowly.

In contrast to responses, the notifications are outputted during intervals of speech activity by the user i.e. whilst the user is still speaking so as to interrupt the user. They are outputted in the form of an audible requests (e.g. synthetic speech), transmitted in the outgoing audio stream 56 as call audio. That is, the notifications are in effect requests directed to the user 2 that are spoken by the bot 36 in the same way as it speaks its responses.

The avatar generator generates a moving image, i.e. video formed of a sequence of frames to be played out in quick succession, of an "avatar". That is a graphical animation representing the bot 36, which may for example have a humanoid or animal-like form (though it can take numerous other forms). The avatar performs various visual actions in the moving image (e.g. arm or hand movements, facial expressions, or other body language), as a means of communicating accessional information to the user 2. These visual actions are controlled at least in part by the response delivery module 48 and overload detector 46, so as to correlate them with the bots "speech". For example, the bot can perform visual actions to accompany the speech, to indicate that the bot is about to speak, to covey a listening state during each interval of speech activity by the user, or to accompany a request spoken by the bot 36 to interrupt the user 2. The moving image of the avatar is encoded as an outgoing video stream 57 in the manner of conventional call video, which is transmitted to the user device 6 in real-time via the network 2.

To further illustrate the operation of the software agent 36, a number of exemplary scenarios will now be described.

EXAMPLE 1

The user 2 starts speaking, causing the ASR system to begin outputting partial results 52. The agent 36 detects the partial results 52 and thus knows the user is speaking. The agent uses the partial results 52 to trigger a keyword search to compute (i.e. formulate) a response 54. The agent 36 sees the final result (i.e. complete sentence) from the speech recognition service 30 and makes a final decision on the response. No more partials are received and agent can make a visual cue that it is getting ready to speak, like the avatar raising a finger, or some other pre-emptive gesture that is human like. The agent then speaks the finalized response 54F.

FIGS. 5A, 5B and 6A collectively illustrate such an example, as discussed.

EXAMPLE 2

The user 2 starts speaking. The agent 36 detects the resulting partial results 52 and thus knows the user 2 is speaking. The agent 36 uses the partial results 52 to trigger keyword search to compute/formulate a response 54. The agent 36 sees the final result 52F (first complete sentence) from the speech recognition service 30 and makes a final decision on the response, as in example 1 and FIGS. 5A and 5B.

However, this time, additional partials are received again which indicates to the agent that the user is still speaking. Therefore, the agent 36 does not start the response, and instead waits for the new (second) sentence to end. The context of first sentence is kept, and combined with the second sentence to formulate response when the second sentence is completed (denoted by a new final result from the language model 34). The alternative scenario of FIG. 6B is such an example.

EXAMPLE 3

The user 2 starts speaking. The agent 36 sees the resulting partial response 54 and thus knows the user is speaking. The agent uses the partial response 54 to trigger a keyword search to compute/formulate a response 54. The agent sees the final result 52F and makes a final decision on the response. No more partials are received and agent makes a visual cue that it is getting ready to speak, like raising a finger, or some other pre-emptive gesture that is human like. The agent 36 begins to speak. After the agent's speech starts, more partials are detected which indicates user is speaking over agent. Therefore the agent 36 takes action to stop speaking, and waits for the next final result from the speech recognition service 30.

EXAMPLE 4

The agent 36 uses the partial results 52, which indicate the flow of the conversation, to guide the user 2 as to how to have the most efficient conversation with the agent 36. For example, the Agent can ask the user to "please slow down a little and give me a chance to respond". The agent 36 may also use visual cues (performed by the avatar) based on the speech recognition results 52/52F to guide the conversation.

As noted, the functionality of the remote system 8 may be distributed across multiple devices. For example, in one implementation the speech recognition service 30 and bot 36 may be implemented as separate cloud services on a cloud platform, which communicate via a defined set of protocols. This allows the services to be managed (e.g. updated and scaled) independently. The keyword lookup service may, for example, be a third party or other independent service made use of by the agent 36.

Moreover, whilst in the above the bot 36 is implemented remotely, alternatively the bot may be implemented locally on the processor 22 of the user device 6. For example, the user device 2 may be a games console or similar device, and the bot 36 implemented as part of a gaming experience delivered by the console to the user 2.

Note the term "set" when used herein, including in the claims, does not necessarily mean a set in the strict mathematical sense i.e. in some cases, the same word can appear more than once in a set of words.

A first aspect of the present subject matter is directed to a computer system comprising: an input configured to receive voice input from a user; an ASR system for identifying individual words in the voice input, wherein the ASR system is configured to generate in memory a set of one or more words it has identified in the voice input, and update the set each time it identifies a new word in the voice input to add the new word to the set; a speech detection module configured to detect a condition indicative of speech inactivity in the voice input; and a response module configured to generate based on the set of identified words, in response to the detection of the speech inactivity condition, a response for outputting to the user; wherein the speech detection module is configured to determine whether the ASR system has identified any more words in the voice input during an interval of time commencing with the detection of the speech inactivity condition; and wherein the response module is configured to output the generated response to the user after said interval of time has ended and only if the ASR system has not identified any more words in the voice input in that interval of time, whereby the generated response is not outputted to the user if one or more words are identified in the voice input in that interval of time by the ASR system.

In embodiments, the speech detection module may be configured monitor the set of identified words in the memory as it is updated by the ASR system, and detect said speech inactivity condition based on said monitoring of the identified set of words.

For example, the computer system may further comprise a language model, wherein detecting the speech inactivity condition may comprise detecting, by the speech detection module, when the set of identified words forms a grammatically complete sentence according to the language model.

Alternatively, or in addition, detecting the speech inactivity condition may comprise detecting, by the speech detection module, that no new words have been identified by the ASR system for a pre-determined duration, wherein the interval of time commences with the expiry of the pre-determined duration.

The response may be an audio response for playing out to the user in audible form.

The computer system may comprise a video generation module configured to, in response to the response module determining that the ASR system has not identified any more words in the interval of time, output to the user a visual indication that the outputting of the response is about to begin.

The video generation module may be configured to generate and output to the user a moving image of an avatar, wherein the visual indication may be a visual action performed by the avatar.

Each word of the set may be stored in the memory as a string of one or more characters.

The computer system may further comprise a lookup module configured to receive at least one word from the set in the memory at a first time whilst updates to the set by the ASR system are still ongoing, and perform a lookup to pre-retrieve information associated with the at least one word. The response generation module may be configured to access the set in the memory at a later time, the set having been updated by the ASR system at least once between the first time and the later time, the response being generated by the response module based on the set as accessed at the later time, wherein the response may incorporate the information pre-retrieved by the lookup module.

The computer system may further comprise a response delivery module configured to begin outputting the audio response to the user when the interval of time has ended, wherein the outputting of the audio response may be terminated before it has completed in response to the speech detection module detecting the start of a subsequent speech interval in the voice input.

The speech detection module may be configured to detect the start of subsequent speech interval by detecting an identification of another word in the voice input by the ASR system, the speech interval commencing with the detection of the other word.

The computer system may further comprise: a speech overload detection module configured to detect at a time during a speech interval of the voice input a speech overload condition; and a notification module configured to output to the user, in response to said to detection, a notification of the speech overload condition.

The speech overload condition may be detected based on:
a number of words that the ASR system has identified so far in that speech interval, and/or
a rate at which words are being identified by the ASR system in that speech interval, and/or
a state of an AI tree being driven by the voice input.

Another aspect of the present subject matter is directed to a computer-implemented method of effecting communication between a user and an artificial intelligence software agent executed on a computer, the method comprising: receiving at an ASR system voice input from the user; identifying by the ASR system individual words in the voice input, wherein the ASR system generates in memory a set of one or more words it has identified in the voice input, and updates the set each time it identifies a new word in the voice input to add the new word to the set; detecting by the software agent a condition indicative of speech inactivity in the voice input; generating by the software agent based on the set of identified words, in response to the detected speech inactivity condition, a response for outputting to the user; determining whether the ASR system has identified any more words in the voice input during an interval of time commencing with the detection of the speech inactivity condition; and outputting the response to the user, by the software agent, after said interval of time has ended and only if the ASR system has not identified any more words in the voice input in that interval of time, whereby the generated response is not outputted to the user if one or more words are identified in the voice input in that interval of time.

In embodiments, the voice input may be received from a user device via a communication network, wherein the outputting step may be performed by the software agent transmitting the response to the user device via the network so as to cause the user device to output the response to the user.

The voice input may be received from and the response outputted to the user in real-time, thereby effecting a real-time communication event between the user and the software agent via the network.

The method may be implemented in a communication system, wherein the communication system comprises a user account database storing, for each of a plurality of users of the communication system, a user identifier that uniquely identifies that user within the communication system. A user identifier of the software agent may also be stored in the user account database so that the software agents appears as another user of the communication system.

The method may further comprise monitoring the set of identified words in the memory as it is updated by the ASR system, wherein the speech inactivity condition may be detected based on the monitoring of the set of identified words.

The response may be an audio response for playing out to the user in audible form.

The method may further comprise, in response to said determination that the ASR system has not identified any more words in the interval of time, outputting to the user a visual indication that the outputting of the response is about to begin.

The visual indication may be a visual action performed by an avatar in a moving image.

Another aspect is directed to a computer program product comprising an artificial intelligence software agent stored on a computer readable storage medium, the software agent for communicating with a user based on the output of an ASR system, the ASR system for receiving voice input from the user and identifying individual words in the voice input, the software agent being configured when executed to perform operations of: detecting a condition indicative of speech inactivity in the voice input; generating based on the set of identified words, in response to the detected speech inactivity condition, a response for outputting to the user; determining whether the ASR system has identified any more words in the voice input during an interval of time commencing with the detection of the speech inactivity condition; and outputting the response to the user after said interval of time has ended and only if the ASR system has not identified any more words in the voice input in that interval of time, wherein the generated response is not outputted to the user if one or more words are identified in the voice input in that interval of time.

In embodiments, the response may be outputted to the user by transmitting it to a user device available to the user via a network so as to cause the user device to output the response to the user.

The response module may be configured to wait for an interval of time from the update that causes the set to form the grammatically complete sentence, and then determine whether the ASR system has identified any more words in the voice input during that interval of time, wherein said outputting of the response to the user by the response module may be performed only if the ASR system has not identified any more words in the voice input in that interval of time.

A fourth aspect of the present subject matter is directed to a computer system comprising: an input configured to receive voice input from a user, the voice input having speech intervals separated by non-speech intervals; an ASR system configured to identify individual words in the voice input during speech intervals thereof, and store the identified words in memory; a response generation module configured to generate based on the words stored in the memory an audio response for outputting to the user; and a response delivery module configured to begin outputting the audio response to the user during a non-speech interval of the voice input, wherein the outputting of the audio response is terminated before it has completed in response to a subsequent speech interval of the voice input commencing whilst the audio response is still being outputted.

Providing a mechanism by which the user can "interrupt" the system provides a more natural and engaging conversation flow. In particular, if the system has misinterpreted the voice input such that the response is not what the user was expecting, the user can interrupt the system simply by speaking. For example, the user may elaborate further on their earlier voice input, and the system may use the context of the more recent part of the voice input and together with the earlier part (that is misinterpreted) to generate and output a more appropriate response.

A fifth aspect of the present subject matter is directed to a computer system comprising: an input configured to receive voice input from a user, the voice input having speech intervals separated by non-speech intervals; an ASR system configured to identify individual words in the voice input during speech intervals of the voice input, and store the identified words in memory; a speech overload detection module configured to detect at a time during a speech interval of the voice input a speech overload condition; and a notification module configured to output to the user, in response to said to detection, a notification of the speech overload condition. The speech overload condition is detected based on:

a number of words that the ASR system has identified so far in that speech interval, and/or a rate at which words are being identified by the ASR system in that speech interval, and/or a state of an AI tree being driven by the voice input.

This provides a more efficient system, as the user is notified when his voice input is becoming uninterpretable by the system (as compared with allowing the user to continue speaking, even though the system is unable to interpret their continued speech).

A sixth aspect of the present subject matter is directed to a computer system comprising: an input configured to receive voice input from a user; an ASR system for identifying individual words in the voice input, wherein the ASR system is configured to generate in memory a set of words it has identified in the voice input, and update the set each time it identifies a new word in the voice input to add the new word to the set; a language model configured to detect when an update by the ASR system of the set of identified words in the memory causes the set to form a grammatically complete sentence; and a response module configured to generate based on the set of identified words a response for outputting to the user, and to output the response to the user in response to said detection by the language model of the grammatically complete sentence.

Generally, any of the functions described herein can be implemented using software, firmware, hardware (e.g., fixed logic circuitry), or a combination of these implementations. The terms "module," "functionality," "component" and "logic" as used herein—such as the functional modules of FIG. 4—generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the remote system 8 or user device 6 may also include an entity (e.g. software) that causes hardware of the device or system to perform operations, e.g., processors functional blocks, and so on. For example, the device or system may include a computer-readable medium that may be configured to maintain instructions that cause the devices, and more particularly the operating system and associated hardware of device or system to perform operations. Thus, the instructions function to configure the operating system and associated hardware to perform the operations and in this way result in transformation of the operating system and associated hardware to perform functions. The instructions may be provided by the computer-readable medium to the display device through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. EXAMPLEs of a computer-readable storage m edium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system comprising:
an input configured to receive voice input from a user;
an Automatic Speech Recognition (ASR) system for identifying individual words in the voice input, wherein the ASR system is configured to generate in memory during at least one speech activity interval in the voice input a word set of one or more words it has identified in the voice input, and update the word set in the memory based on identifying a new word in the voice input to add the new word to the word set;
a lookup module configured to retrieve at least one word from the word set during the speech activity interval in the voice input at a first time whilst the speech activity interval is still ongoing, and perform a lookup whilst the speech activity interval is still ongoing to pre-retrieve information associated with the at least one word, the pre-retrieved information including one or more relevant words that are contextually relevant to and different from the at least one word from the word set; and
a response generation module configured to detect an end of the speech activity interval at a second time that is subsequent to the first time, the word set having been updated by the ASR system at least once between the first time and the second time, and the response generation module further configured to generate a response for output, wherein the response conveys the pre-retrieved information from the lookup module.

2. A computer system according to claim 1, wherein the response is generated based on one or more of a confidence value assigned to one or more words of the word set by the ASR system, or a confidence value assigned to the word set by a language model of the computer system.

3. A computer system according to claim 1, wherein the pre-retrieved information is pre-retrieved from an Internet search engine.

4. A computer system according to claim 1, wherein the user is a user of a communication system and the pre-retrieved information is information about another user in the communication system.

5. A computer system according to claim 3, wherein the pre-retrieved information comprises contact details for the other user.

6. A computer system according to claim 1, comprising a speech detection module configured monitor the word set as it is updated by the ASR system, wherein the response generation module is configured to detect the end of the speech activity interval based on said monitoring of the word set.

7. A computer system according to claim 6, further comprising a language model, wherein detecting the end of the speech activity interval comprises detecting, by the speech detection module, when the word set forms a grammatically complete sentence according to the language model.

8. A computer system according to claim 6, wherein detecting the end of the speech activity interval comprises detecting, by the speech detection module, that no new words have been identified by the ASR system for a predetermined duration.

9. A computer system according to claim 1, wherein the response is an audio response for playing out in audible form.

10. A computer system according to claim 1, comprising a video generation module configured to generate and output a moving image of an avatar configured to convey when output of the response is about to begin by performing a visual action.

11. A computer system according to claim 6, wherein the response is an audio response, the computer system further comprising:
a speech detection module;
a response delivery module configured to begin outputting the audio response to the user when the speech activity interval has ended, wherein the outputting of the audio response is terminated before it has completed in response to the speech detection module detecting a start of a subsequent speech activity interval in the voice input.

12. A computer system according to claim 11, wherein the speech detection module is configured to detect the start of subsequent speech activity interval by detecting an identification of another word in the voice input by the ASR system, the subsequent speech activity interval commencing with the detection of the other word.

13. A computer-implemented method of effecting communication between a user and an artificial intelligence software agent executed on a computer, the method comprising:
receiving at an Automatic Speech Recognition (ASR) system voice input from the user;
identifying by the ASR system individual words in the voice input;
generating a word set of one or more identified words in memory and during at least one speech activity interval in the voice input;
updating the word set in the memory based on identifying a new word in the voice input to add the new word to the word set;
retrieving during the speech activity interval in the voice input at least one word from the word set at a first time whilst the speech activity interval is ongoing;
performing a lookup whilst the speech activity interval is ongoing to pre-retrieve information associated with the at least one word, the pre-retrieved information including one or more relevant words that are contextually relevant to and different from the at least one word from the word set;
detecting an end of the speech activity interval at a second time that is subsequent to the first time, the word set having been updated at least once between the first time and the second time; and
generating a response by the software agent, wherein the response includes the pre-retrieved information.

14. A method according to claim 13, wherein the voice input is received from a user device via a communication network, the method further comprising transmitting the response to the user device via the communication network so as to cause the user device to output the response.

15. A method according to claim 14, wherein the voice input is received from and the response outputted to the user in real-time, thereby effecting a real-time communication event between the user and the software agent via the communication network.

16. A method according to claim 13, the method being implemented in a communication system, wherein the communication system comprises a user account database storing, for each of a plurality of users of the communication system, a user identifier that uniquely identifies that user within the communication system;

wherein a user identifier of the software agent is also stored in the user account database so that the software agents appears as another user of the communication system.

17. A method according to claim 13, comprising monitoring the word set in the memory as it is updated by the ASR system, the end of the speech activity interval being detected based on said monitoring of the word set.

18. A method according to claim 13, wherein detecting the end of the speech activity interval comprises detecting when the word set forms a grammatically complete sentence according to a language model.

19. A computer program product comprising an artificial intelligence software agent stored on a computer readable memory device, the software agent being configured when executed by one or more processors to perform operations comprising:
  identifying individual words in voice input during a speech activity interval in the voice input to generate a word set that includes the individual words;
  retrieving at least one word from the word set during the speech activity interval in the voice input and at a first time whilst the speech activity interval is ongoing;
  performing a lookup whilst the speech activity interval is ongoing to pre-retrieve information associated with the at least one word, the pre-retrieved information including one or more relevant words that are contextually relevant to and different from the at least one word from the word set;
  detecting an end of the speech activity interval at a second time that is subsequent to the first time, the word set having been updated at least once between the first time and the second time; and
  generating a response for output, wherein the response conveys the pre-retrieved information.

20. A computer program product according to claim 19, wherein the response is output by transmitting the response to a user device via a network so as to cause the user device to output the response.

* * * * *